Nov. 27, 1945.   W. B. POND ET AL   2,389,814
FILTER
Filed Sept. 10, 1943   2 Sheets-Sheet 1
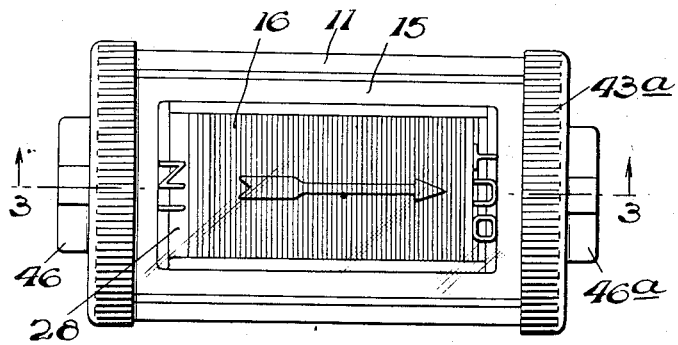
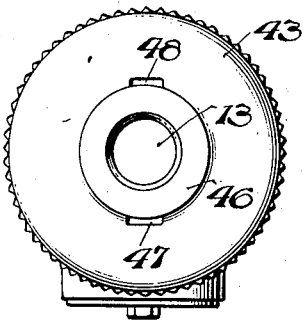
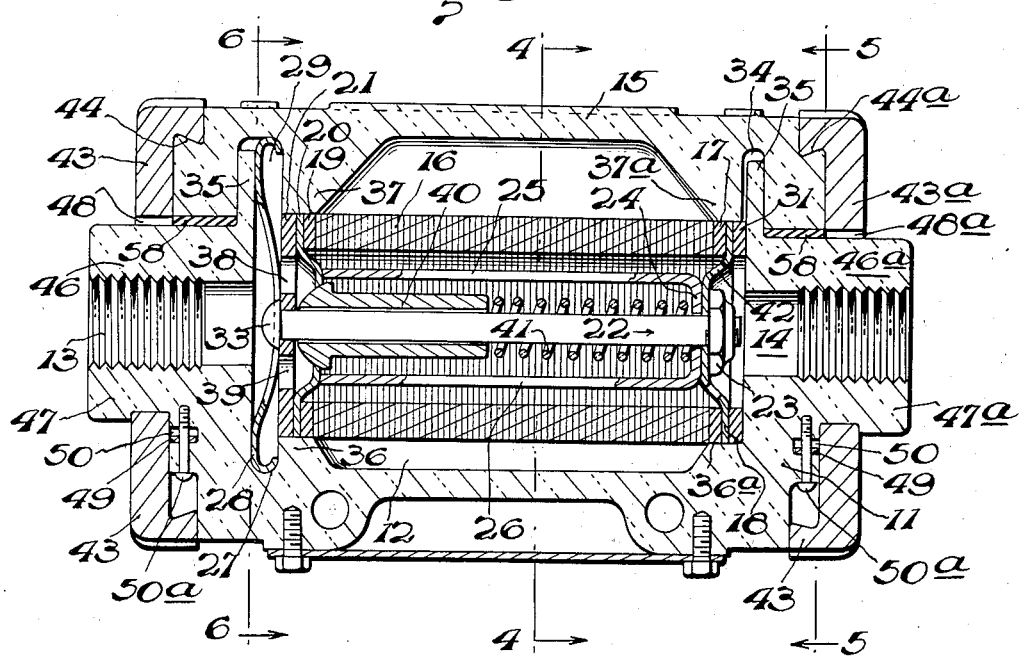
INVENTORS
William B. Pond
BY Guild R. Holt
Herbert L. Davis, Jr.
ATTORNEY

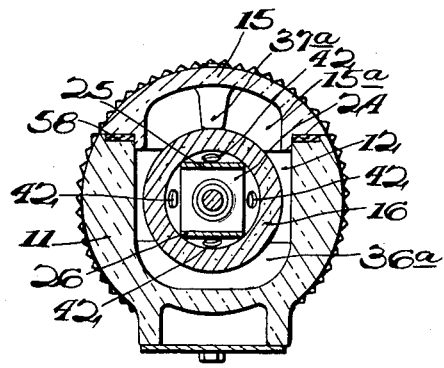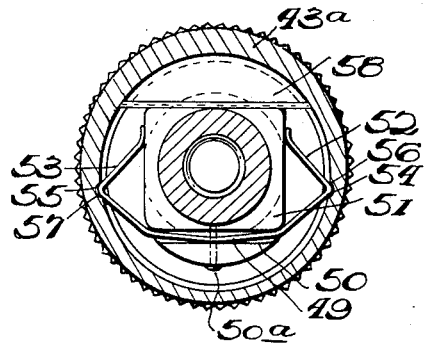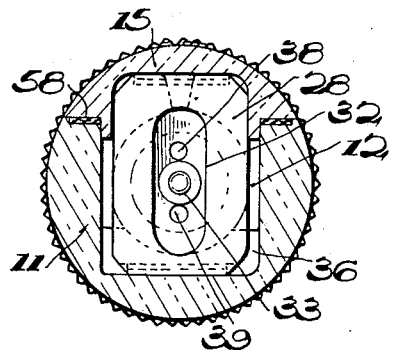

Patented Nov. 27, 1945

2,389,814

UNITED STATES PATENT OFFICE 2,389,814

FILTER

William B. Pond, West Englewood, and Guild R. Holt, Hohokus, N. J., assignors to Bendix Aviation Corporation, Teterboro, N. J., a corporation of Delaware Application September 10, 1943, Serial No. 501,862

2 Claims. (Cl. 210—164)

This invention relates to filter units and more particularly to a device for separating out and removing matter suspended in a fluid.

An object of our invention is to provide a compact filter mounting in which a filter unit may be conveniently installed.

Another object of our invention is to provide novel means for observing the condition of the filter.

Another object of our invention is to provide a novel valve means, whereby upon the coarser particles within a filter fluid impairing the passage of the fluid through a filter the same may be by-passed through said valve until such time as the filter may be removed and cleaned.

Another object of our invention is to provide a novel relief valve compactly mounted within the filter unit for permitting passage of a fluid medium when the filter has become clogged.

A further object of our invention is to provide a compact filter unit particularly adapted for use on airplanes in filtering anti-icing fluid or in filtering fluid fuel for use in aircraft engines.

Another object of our invention is to provide a filter device which may be conveniently mounted in the cabin and arranged so that the pilot may readily observe the condition of the same.

A further object of our invention is to provide a compact filter unit of great efficiency in comparison to its size and of such simplicity in construction as to adapt it for manufacture and installation at low cost.

The above and further objects and novel features of this invention will more fully appear from the following detailed description and the accompanying drawings wherein like reference characters refer to like parts in the several views. It is to be expressly understood, however, that the drawings are for the purpose of illustration only and are not designed as a definition of the limits of the invention reference being had for this purpose to the appended claims.

In the accompanying drawings which form a part of this specification like characters of reference indicate like parts in the several views wherein:

Figure 1 is a top plan view of one form of our invention.

Figure 2 is an end view of Figure 1.

Figure 3 is an enlarged sectional view taken along the lines 3—3 of Figure 1 and looking in the direction of the arrows.

Figure 4 is a cross-sectional view taken along the lines 4—4 of Figure 3 and looking in the direction of the arrows.

Figure 5 is a cross-sectional view taken along the lines 5—5 of Figure 3 and looking in the direction of the arrows.

Figure 6 is a cross-sectional view taken along the lines 6—6 of Figure 3 and looking in the direction of the arrows.

In the form of the invention illustrated in Figure 1 there is provided, as shown in Figure 3, a casing 11 formed of a suitable clear plastic material. The casing 11 has formed therein a longitudinally extending channel 12 open at one side. The channel 12 has provided at opposite ends thereof suitable screw threaded channels 13 and 14. The channel 13 provides an inlet for a fluid medium to the channel 12, while the channel 14 serves as an outlet for said fluid medium.

The longitudinally extending channel 12 may be closed at its open side by a cap like member 15 having a longitudinally extending channel 15a formed therein. The cap 15 is arranged to fit over the open side of the channel 12 and to enclose the same.

A tubular filter 16 formed of a suitable porous material of a type well known in the art is positioned longitudinally within the channel 12. The tubular filter 16 has positioned at the outlet end thereof a gasket 17 held in place by a plate 18. At the opposite end of the tubular filter 16 is positioned a gasket 19 and a plate 20 held in place by a plate 21. The plates 18 and 21 positioned at the opposite ends of the tubular filter 16 are secured in place by a bolt 22 engaging at one end the plate 21 and secured at the opposite end to the plate 18 by a nut 23.

A U-shaped strap 24 is further carried on the bolt 22 and has the arms 25 and 26 extending longitudinally within the tubular filter 16 and engaging at opposite ends the plates 18 and 21. The sides of the U-shaped strap 24, as shown in Figure 4, support the tubular filter 16 against inwardly directed pressure.

The casing 11 has provided a slot 27 in which is positioned one end of a leaf spring 28. A slot 29 corresponding to the slot 27 is provided in the cap 15 and is adapted to receive a flange 30 projecting from the casing 11 together with the other end of the leaf spring 28. The leaf spring 28 bears at one end upon the flange 30 and at the opposite end in the slot 27 upon the casing 11. The leaf spring 28 further bears at a point intermediate the opposite ends thereof upon the plate 21 so as to bias the tubular filter 16 toward the outlet end thereof against a gasket 31 positioned within the channel 12.

The leaf spring 28 has further provided a slot 32 for freely receiving a head portion 33 of the bolt 22, as shown in Figure 6. The cap 15 also has provided a slot 34 for receiving a flange 35 projecting from the casing 11. The flange 30 disposed within the slot 27, and the flange 35 disposed within the slot 34, provide convenient means for positioning the cap 15 upon the casing 11.

As shown in Figure 4, the tubular filter 16 rests upon flanges 36 and 36a, which project from the bottom of the channel 12 at the opposite ends thereof. An arcuate recess is formed in the flanges 36 and 36a for receiving a portion of the tubular filter 16.

Flanges 37 and 37a project inwardly from the cap 15 and are adapted to engage the tubular filter 16 at the opposite ends thereof so as to hold the same in place within the channel 12.

The plate 21 has provided the openings 38 and 39 leading into the tubular filter 16. The inlet end of the tubular filter 16 is closed by the plate 20, which is fastened to the arms 25 and 26, and has formed therein an annular opening closed by a valve member 40, slidably mounted on the bolt 22. The valve member 40 is biased into a valve closing position by a helical spring 41 bearing at one end upon the plate 24 and at the opposite end upon the valve member 40. The plate 18 has formed therein suitable openings 42 leading from the interior of the tubular filter 16 into the outlet channel 14.

The cap 15 is fastened in place upon the casing 11 by suitable fastening members 43 and 43a which are arranged to engage, respectively, suitable cam surfaces 44 and 44a provided at opposite ends of the cap 15. An annular opening is provided on each of the respective fastening members for receiving annular members 46 and 46a projecting from opposite ends of the casing 11 and through which extend the inlet and outlet channels 13 and 14, respectively. The receiving members 46 and 46a have provided a projecting lug 47 and 47a, respectively, for engaging the outer surface of the fastening members 43 and 43a so as to secure the same in place at the opposite ends of the casing 11. Slots 48 and 48a are formed in the fastening members 43 and 43a, respectively, through which the lugs 47 and 47a may readily pass when positioning the fastening members 43 and 43a on the projecting portions 46 and 46a of the casing 11. It will be readily seen that in assembling the cap 15 and adjustable fastening members 43 and 43a on the casing 11, the operator or pilot first places the cap 15 in position and then places the fastening members 43 and 43a at opposite ends of the casing 11 on the projecting portion 46 and 46a, with the lugs 47 and 47a passing through the slots 48 and 48a, respectively. An adjustment or twist of 180 degrees of the fastening member 43 and 43a by the operator will then cause the fastening members 43 and 43a to secure the cap 15 in place by engaging the cam surfaces 44 and 44a provided at the opposite ends thereof. Further the lugs 47 and 47a will likewise engage the outer surface of the fastening members 43 and 43a, as shown in Figures 2 and 3. In order to remove the cap 15 it is necessary for the operator to merely reverse the operation described.

There is further provided, as illustrated in Figure 5, a leaf spring 49 positioned in a slot 50 formed in a projecting portion of the casing 11 indicated by the numeral 51. A suitable pin or screw 50a is provided for securing the leaf spring 49 in the slot 50. The leaf spring 49 has provided the arm portions 52 and 53 bent at points 54 and 55 and slidably engaging at the free ends thereof the side surfaces of the projecting portions 51. The points 54 and 55 of the leaf spring 49 are arranged to engage in notches 56 and 57, respectively, formed in the inner circumferential surface of the fastening member 43 and thus secure the fastening member 43a in a locked relation under tension of spring 49. The fastening member 43 is constructed in like manner to member 43a.

A gasket 58 is further positioned between the cap 15 and the casing 11 so that the same fits in sealing relation, as indicated in Figures 3, 4, 5 and 6.

In the operation of our novel filter device it will be seen from Figure 3 that upon a fluid medium under suitable pressure entering the filter device through an inlet channel 13 the said fluid medium will pass into the longitudinally extending channel 12. The said fluid medium will then circulate through the porous wall of the tubular filter unit 16 into the interior thereof, through the openings 42, and out the outlet channel 14.

It will be further seen should the porous wall of the tubular filter unit 16 become clogged by dirt or coarse particles filtered from the fluid medium so as to thereby impair the passage of fluid medium through the same, that the pressure of the fluid medium acting through the openings 38 and 39 will bias the valve member 40 so as to permit the direct entrance of the fluid medium into the interior of the filter unit 16 without passing through the filter wall 16. Thus the operation of essential aircraft mechanism will not be impaired by the clogging of the filter 16. The openings 38 and 39 are formed of a size sufficient to prevent the passage of dangerously large particles of material through the filter device. Moreover since the casing 11 and top 15 are formed of a suitable clear plastic material, the interior of the filter device may be readily observed at all times. The filter unit is arranged for mounting within the interior of the plane cabin so that upon the clogging of the filter and the by-passing of the fluid medium through the device by the action of the valve member 49, such action may be readily observed by the pilot.

Thus the filter unit 16 may be cleaned or replaced at the pilot's convenience, without impairing the operation of essential aircraft mechanism during the period prior to the cleaning or replacement of the filter unit 16.

It will be further seen that upon removing the top 15 the filter unit 16 may be conveniently removed for cleaning or replacement by removing leaf spring 28. This may be readily accomplished by the pilot inserting the tip of the finger under the upper under-turned portion of the leaf spring and thereby removing the leaf spring 28; which as shown in Figure 6, is unattached to the tubular filter unit 16. Upon removing the leaf spring 28 the tubular filter unit 16 may be readily removed from the casing 11 by the fingers of the pilot.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. A filter device, comprising, in combination, a casing formed of a clear plastic material, a fluid medium inlet channel provided at one end of said casing, a fluid medium outlet channel provided at the opposite end of said casing, a porous tubular filter unit positioned in said casing in longitudinal alignment with said inlet and outlet channels, said porous tubular filter unit open at one end to said outlet channel, a valve opening provided at the opposite end of said tubular filter unit for connecting said inlet and outlet channels through said tubular filter unit, a valve member mounted within said tubular filter unit and longitudinally movable in relation thereto, spring means provided within said tubular filter unit for normally biasing said valve member in such a manner as to close said valve opening to said inlet channel, a third channel formed within said casing and opening at one side of said casing, said third channel connected to said inlet channel, a leaf spring mounted in said third channel and biasing said tubular filter unit longitudinally toward said outlet channel in such a manner as to fasten said one end of said tubular filter unit at the inner end of said outlet channel, a removable cap member extending longitudinally on said casing for closing the open side of said third channel, fastening members mounted at opposite ends of said casing for securing said cap member in position, said fastening members rotatably adjustable for fastening and releasing said cap, and said leaf spring having a turned over end portion whereby said leaf spring may be manually removed upon release of said cap so as to enable the removal of said tubular filter unit from said casing.

2. A filter device, comprising, in combination, a casing, a main channel formed in said casing and extending longitudinally therein, said main channel opening at one side of said casing, a cap like member arranged to close the opening at said one side of said casing, fluid inlet and outlet channels formed in said casing and opening at opposite longitudinal ends of said main channel, a porous tubular filter unit positioned in said main channel in longitudinal alignment with said inlet and outlet channels, resilient means biasing said tubular filter unit longitudinally toward one end of said main channel, fastening means for securing said cap like member in position, said fastening means adjustable so as to permit removal of said cap so as to open said main channel at said one side of said casing, whereupon removal of said tubular filter unit may be manually effected through the opening at said one side of said casing.

WILLIAM B. POND.
GUILD R. HOLT.